United States Patent [19]

Kondo et al.

[11] Patent Number: 4,998,162
[45] Date of Patent: Mar. 5, 1991

[54] VIDEO CAMERA

[75] Inventors: Toshiharu Kondo; Akihiro Kikuchi; Takashi Kohashi, all of Chiba, Japan

[73] Assignee: Sony Corporation, Tokyo, Japan

[21] Appl. No.: 393,804

[22] Filed: Aug. 15, 1989

[30] Foreign Application Priority Data

Aug. 22, 1988 [JP] Japan .................................. 63-208825
Aug. 26, 1988 [JP] Japan .................................. 63-213098
Aug. 29, 1988 [JP] Japan .................................. 63-215850

[51] Int. Cl.⁵ ..................... H04N 5/235; H04N 5/238; H04N 5/343; H04N 9/73
[52] U.S. Cl. ...................................... 358/41; 358/29; 358/227; 358/228
[58] Field of Search ................... 358/29, 227, 228, 41

[56] References Cited

U.S. PATENT DOCUMENTS

| | | | |
|---|---|---|---|
| 3,555,181 | 1/1971 | Thommen | 358/228 |
| 4,427,996 | 1/1984 | Tamura | 358/228 |
| 4,616,264 | 10/1986 | Pshtissky | 358/227 |
| 4,684,995 | 8/1987 | Baumeister | 358/227 |
| 4,752,831 | 6/1988 | Biber et al. | 358/227 |
| 4,782,396 | 11/1988 | Park | 358/227 |
| 4,833,541 | 5/1989 | Takuma et al. | 358/227 |

Primary Examiner—John W. Shepperd
Attorney, Agent, or Firm—Alvin Sinderbrand; William S. Frommer

[57] ABSTRACT

In a camera having a lens for focussing incident light onto a light reception surface of a pick-up so that the latter outputs a camera signal, a stop for limiting the amount of the incident light, and a variable gain amplifier for correcting the level of the camera signal; there is provided a control circuit which controls a focus of the lens, the stop and a gain of the variable gain amplifier on the basis of the output of the variable gain amplifier, thereby simplifying the construction of the camera as a whole.

25 Claims, 6 Drawing Sheets

/ VIDEO CAMERA

BACKGROUND OF THE INVENTION

1. Field of the Invention

The present invention relates to a camera or image pick-up device and, more particularly, is directed to improvements in a color television camera.

2. Description of the Prior Art

Figure 1A:
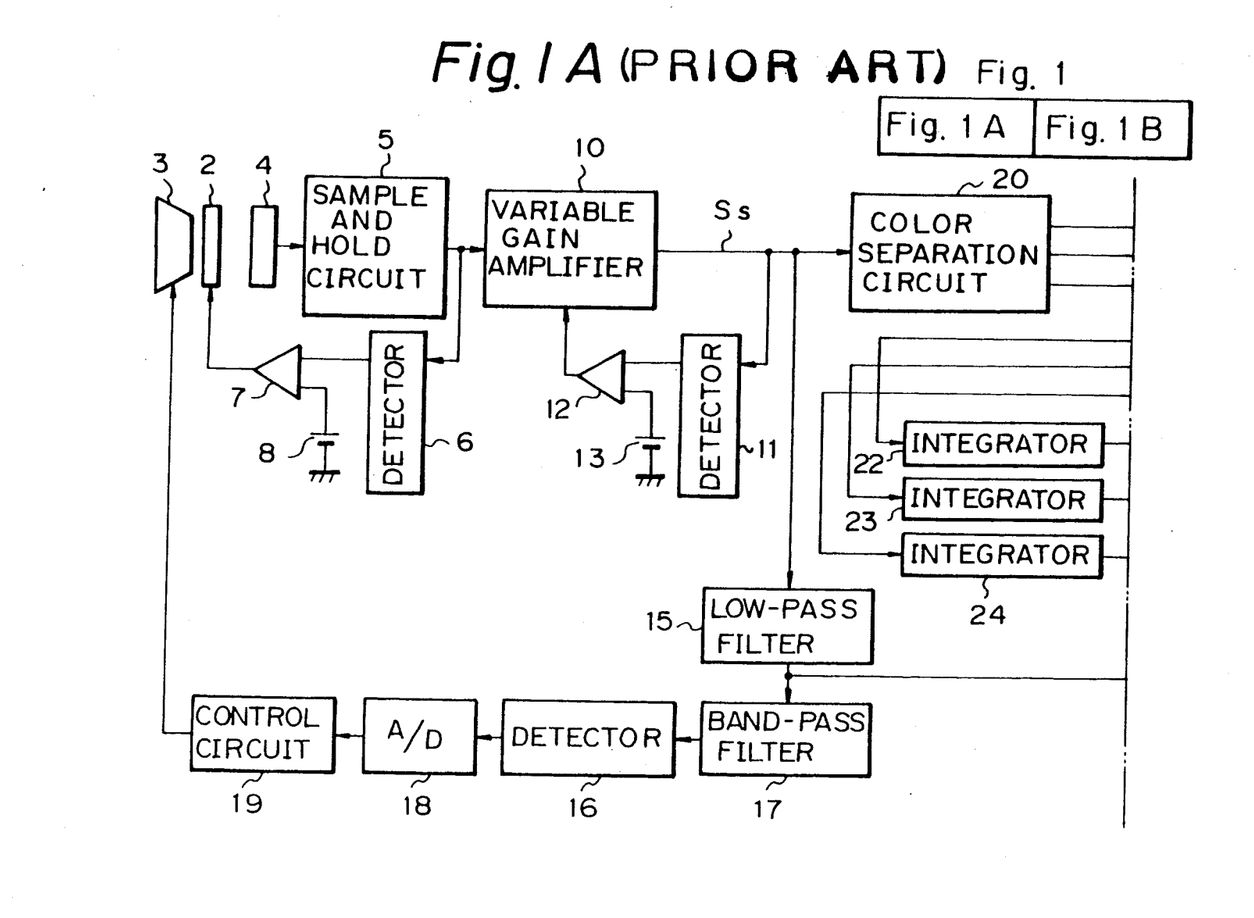
FIGS. 1A and 1B together constitute a block diagram showing a video camera according to the prior art.
Figure 1B:
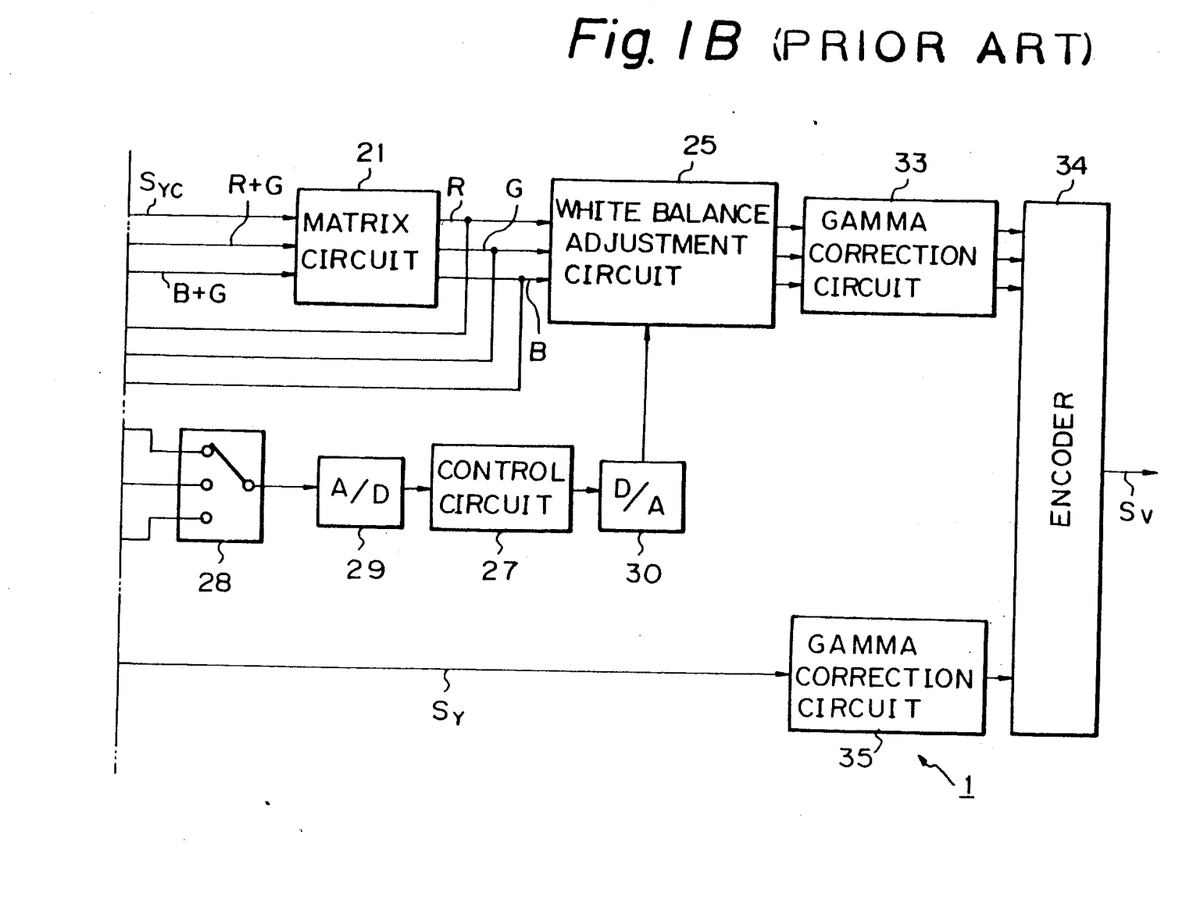

In a color television camera 1 according to the prior art, as disclosed in U.S. Pat. No. 4,427,996, and as illustrated in FIGS. 1A and 1B hereof, an image of a desired camera subject is formed on a light reception surface of a solid-state pick-up element 4 by a lens 3 through a variable stop or iris.

The pick-up element 4 has complementary color filters on its light reception surface and produces an output signal corresponding to each picture element of the image which is supplied to a sample and hold circuit 5 at the timing of the raster scanning. A detector 6 receives the output or camera signal from the sample and hold circuit 5 and detects the amount of incident light impinging on the solid-state pick-up element 4 on the basis of the level of the camera signal. A comparator 7 compares the output of the detector 6 with a reference voltage from a source 8 and provides a comparison result which is applied to the stop or iris 2 for controlling the latter.

By the foregoing arrangement, the amount of the light incident on the solid-state pick-up element 4 is controlled to be equal to or less than a predetermined value so that a camera signal produced from the sample and hold circuit 5 is made to have a predetermined signal level.

Further, as is shown, a variable gain amplifier 10 receives the camera signal from the sample and hold circuit 5 and supplies a corresponding output signal to a detector 11 which detects the level of such output signal. A comparator 12 compares the output of the detector 11 with a reference voltage from a source 13 and the resulting comparison output variably controls a gain of the variable gain amplifier 10. By the foregoing arrangement, the gain of the variable gain amplifier 10 is controlled to be increased only when the amount of light is insufficient, for example, due to a dark camera subject, even when the stop 2 is fully opened. In other words, the variable stop 2 is controlled in preference to the variable gain amplifier 10, with the gain of the variable gain amplifier 10 being controlled in a range where correction cannot be achieved by the stop 2 alone, whereby a camera signal $S_s$ with a predetermined signal level is maintained.

Furthermore, as shown, a low-pass filter 15 receives the camera signal $S_s$ from the variable gain amplifier 10 and extracts therefrom a luminance signal $S_Y$. A detector 16 receives a relatively high frequency component of the luminance signal $S_Y$ from the filter 15 through a band-pass filter 17 and provides an envelope detection output which is supplied to an analog-to-digital converter 18, and the resulting digital signal from converter 18 is supplied to a control circuit 19. The control circuit 19 provides a control signal to the lens 3 which is based on the level of the envelope detection output from detector 16 so that the focus of the lens 3 is controlled to maintain a focused state of the central portion of the projected image on the pickup element 4.

A color separation circuit 20 is also shown to receive the camera signal $S_s$ from the variable gain amplifier 10 and converts the camera signal $S_s$ into a luminance signal $S_{YC}$, a composite signal R+G of red and green and a composite signal B+G of blue and green. A matrix circuit 21 converts the luminance signal $S_{YC}$ and the composite signals R+G and B+G into red, green and blue color signals R, G and B, respectively, and then outputs such color signal R, G and B to integrators 22, 23 and 24, respectively, and to a white balance adjustment circuit 25.

A control circuit 27 selectively receives the output signals of the integrators 22, 23 and 24 through a selector 28 and an analog-to-digital converter 29 and detects the signal levels of the color signals R, G and B on the basis of their respective integrated values. In response to such detected levels of the color signals R, G and B, the control circuit 27 generates a control signal which is supplied to the white balance adjustment circuit 25 through a digital-to-analog converter 30, so that the degrees of amplification of the red and blue color signals R and B are variably controlled for maintaining a predetermined ratio of the signal levels of the color signals R, G and B relative to each other. In that way, color signals of predetermined white balance are obtained from the white balance adjustment circuit 25, and are supplied to an encoder 34 through a gamma correction circuit 33 for the color signals.

On the other hand, a gamma correction circuit 35 receives the luminance signal $S_Y$ from the low-pass filter 15 and the resulting gamma corrected luminance signal is also supplied to the encoder 34. In the encoder 34, the color signals and the luminance signal are converted into respective color difference signals which are modulated into chroma signals, and the latter are superimposed on the luminance signal so as to provide a video signal $S_V$.

However, in the above-described known video camera, separate control circuits are provided for control of the stop 2, the gain of the variable gain amplifier 10, the focus of the lens 3 and the white balance adjustment circuit 25. As a result, the construction of the video camera is undesirably complicated. Even the control circuits for the stop 2 and the variable gain amplifier 10 are composed of respective detectors 6 and 11, reference voltage sources 8 and 13 and comparators 7 and 12, so as to undesirably complicate the structure.

Further, it would be desirable to provide this kind of video camera with modes or functions characteristic of a single lens reflex camera, such as, a shutter preference mode and a stop preference mode in addition to an automatic adjustment mode, so that the freedom of use of the camera can be enhanced.

OBJECTS AND SUMMARY OF THE INVENTION

An object of the present invention is to provide a video camera of simplified structure as a whole.

Another object of the present invention is to provide a video camera with selectively established modes for enhancing its freedom of use.

In accordance with an aspect of the present invention, a video camera comprises:

pick-up means for outputting a picked-up signal;

lens means for directing incident light against a light reception surface of the pick-up means;

stop means for limiting the amount of the incident light;

variable gain amplifier means for correcting a signal level of the picked-up signal;

and control means for controlling a focus of the lens means, the stop and a gain of the variable gain amplifier on the basis of an output signal of the variable gain amplifier means.

By controlling the focus of the lens means, the stop means and the gain of the variable gain amplifier on the basis of the output signal from the variable gain amplifier, the construction of the video camera can be substantially simplified.

The above, and other objects, features and advantages of the present invention, will become apparent from the following detailed description of an illustrative embodiment which is to be read with reference to the accompanying drawings.

DETAILED DESCRIPTION OF A PREFERRED EMBODIMENT

Figure 2A:
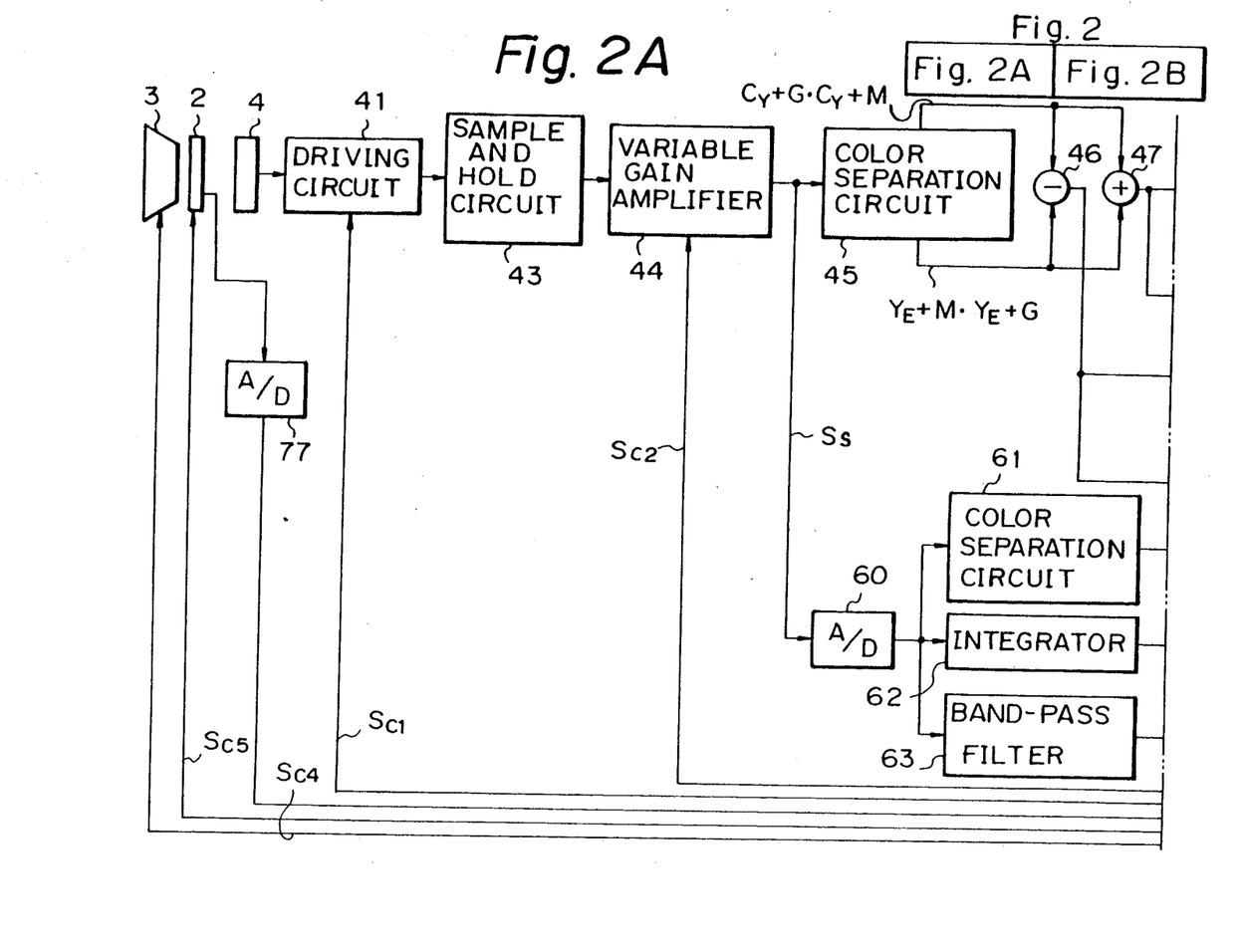
FIGS. 2A and 2B together constitute a block diagram showing a video camera according to an embodiment of the present invention.
Figure 2B:
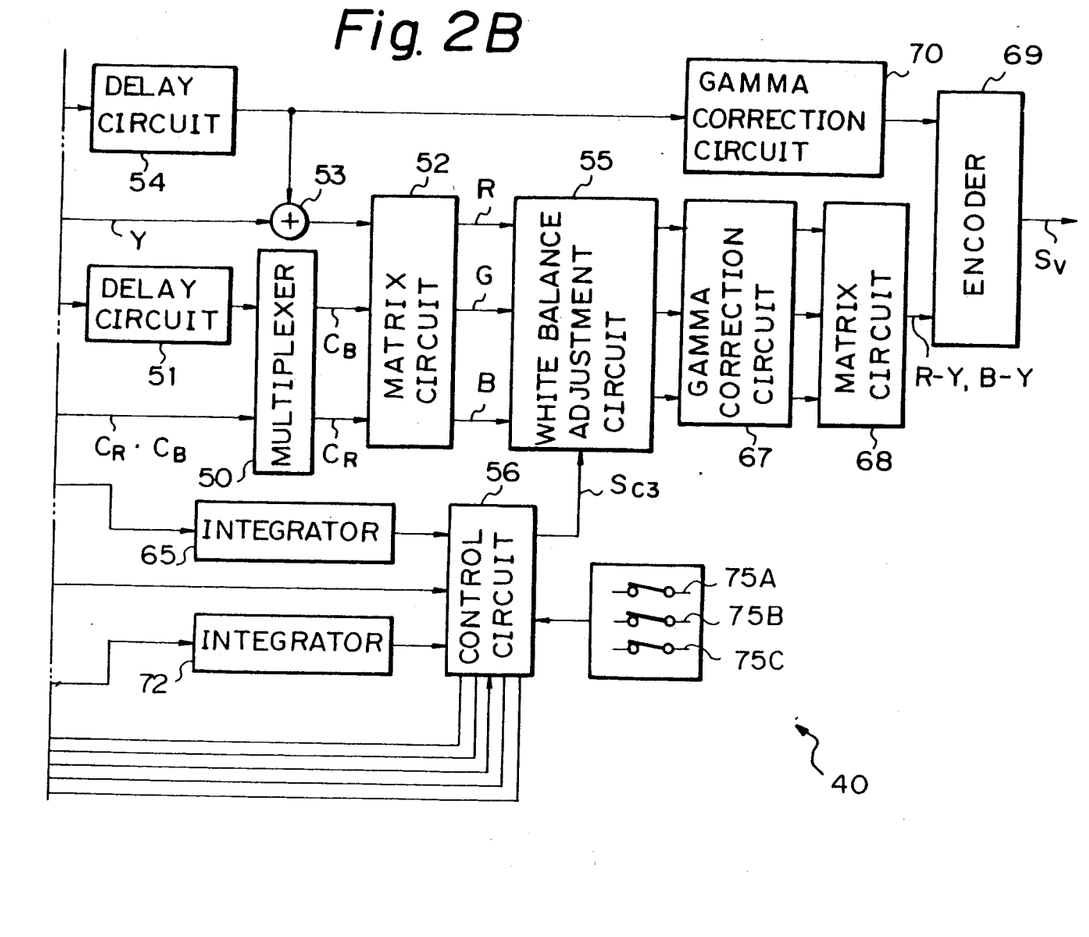

An embodiment of the present invention will now be described in detail with reference to FIGS. 2A and 2B of the drawings in which parts corresponding to those described above with reference to FIGS. 1A and 1B are identified by the same reference numerals. More particularly, the video camera 40 of FIGS. 2A and 2B is shown to comprise a variable stop 2 through which a lens 3 projects a light image corresponding to an object in the field of view of the camera onto a light reception surface of a CCD (charge coupled device) solid-state pick-up element 4 associated with a driving circuit 41.

Figure 3:
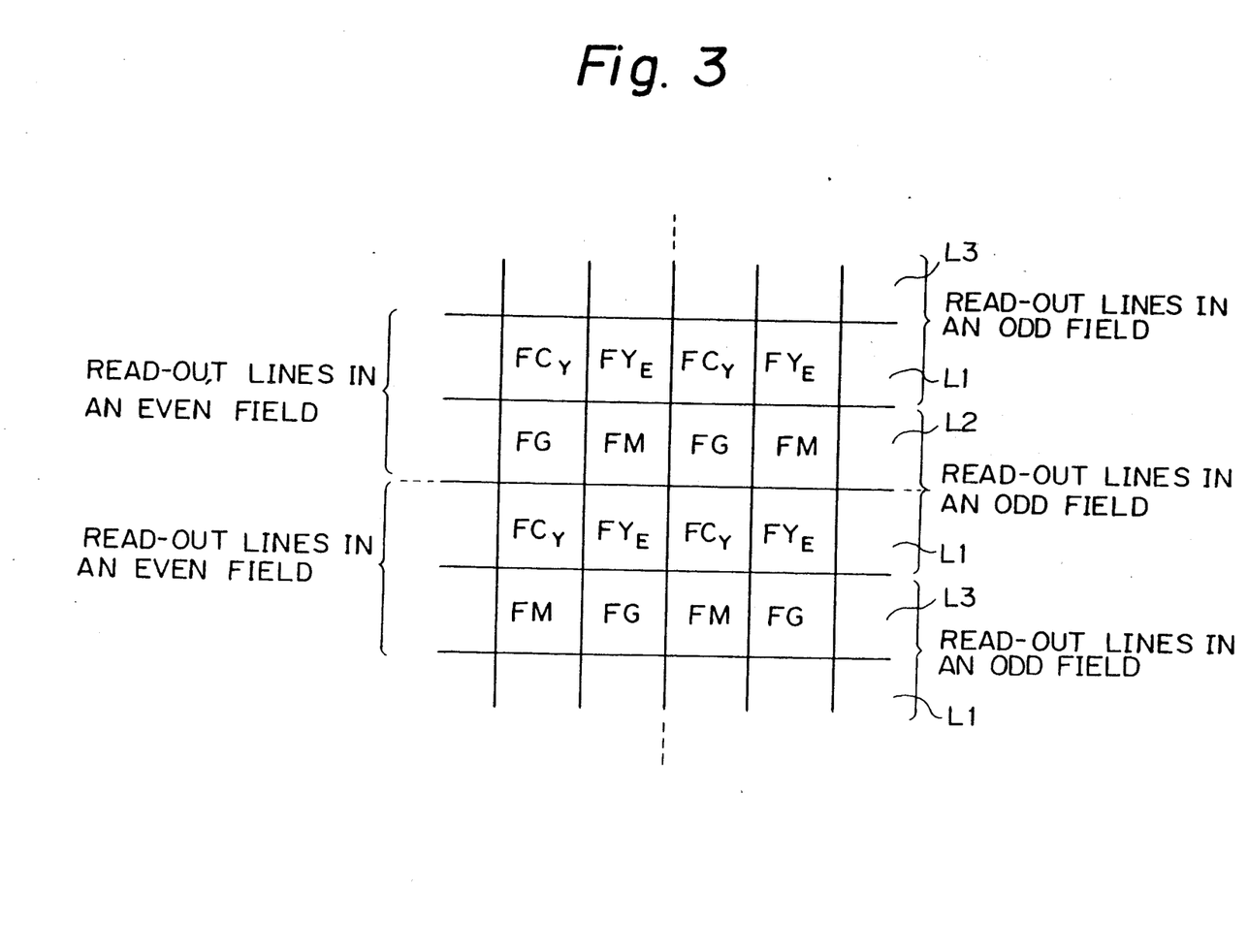
FIG. 3 is a schematic diagram illustrating an arrangement of filters of a solid-state pick-up element for the camera of FIGS. 2A and 2B.

As shown in FIG. 3, the solid-state pick-up element 4 has complementary color filters in a checker-board arrangement and comprised of first lines L1 in which color filters FC and $FY_E$ of cyan and yellow are repeatedly arranged alternately on horizontally successive picture elements. Such first lines L1 are alternated, in the vertical direction, with second lines L2 and third lines L3 in each of which color filters FG and FM of green and magenta are arranged alternately in the horizontal direction. Moreover, the second lines L2 have the color filters FG and FM of green and magenta staggered horizontally in respect to the corresponding color filters FG and FM of the third lines L3.

The driving circuit 41 changes the electric charge storage time (usually about 1/60 second) of the solid-state pickup element 4 on the basis of a control signal $S_{C1}$, and transfers the electric charges stored in all picture elements of the solid state pick-up element 4 to a sample and hold circuit 43 in one frame period.

The sample and hold circuit 43 performs sampling and holding of the output electric charges produced for every two picture elements sequentially so that a camera signal can be provided in accordance with the raster scanning of an interlacing system.

More particularly, in each even field, electric charges stored in picture elements on the first lines L1, and in downwardly adjacent picture elements on the second or third lines L2 or L3, are output simultaneously at the timing of the raster scanning. As a result, a sum signal $S_{W12}$ (FIG. 4A) corresponding to the simultaneously scanned first and second lines L1 and L2, and a sum signal $S_{W13}$ (FIG. 4B) corresponding to the simultaneously scanned first and third lines L1 and L3, are provided alternately in successive horizontal scans of each even field.

Figure 4A:
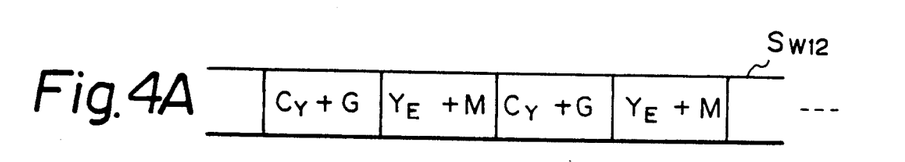
FIGS. 4A and 4B are diagrams showing signals produced in successive scans of the pick-up element shown on FIG. 3.

Therefore, and as shown in FIG. 4A, in the sum signal $S_{W12}$, a sum signal $C_Y+G$, which results from the addition of a cyan picture element signal $C_Y$ produced from a cyan color filter $FC_Y$, and a green picture element signal G, and a sum signal $Y_E+M$, which results from the addition of a yellow picture element signal $Y_E$ and a magenta picture element signal, are obtained alternately.

On the other hand, in the sum signal $S_{W13}$ (FIG. 4B), a sum signal $C_Y+M$, which results from the addition of a cyan picture element signal $C_Y$ and a magenta picture element signal M, and a sum signal $Y_E+G$, which results from the addition of a yellow picture element signal $Y_E$ and a green picture element signal G, are obtained alternately.

Figure 4B:
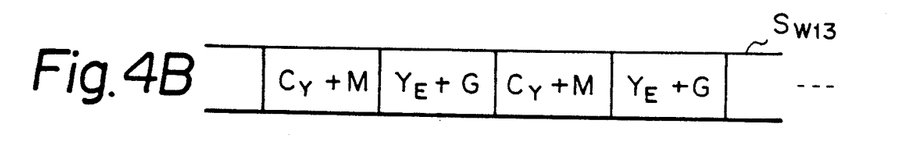

In contrast to the above, in each odd field, electric charges stored in picture elements on the first lines L1 and upwardly adjacent picture elements on the third or second lines L3 or L2, are output simultaneously at the same timing as the raster scanning. Consequently, interlaced scanning can be provided, and a camera signal is obtained by suitably switching the repetition of the sum signals $C_Y+G$, $C_Y+M$, $Y_E+M$ and $Y_E+G$ for every horizontal scanning.

The variable gain amplifier 44 is made so that its gain can be varied within the range of about ±20 [dB] in response to a control signal $S_{C2}$, whereby the amplifier 44 either amplifies the camera signal or attenuates it for providing the amplifier output $S_S$.

A color separation circuit 45 receives the amplified camera signal $S_S$ provided by the variable gain amplifier 44, and delays the sum signals $C_Y+G$ and $C_Y+M$, which are obtained by the addition of a green or magenta picture element signal G or M and a cyan picture element signal $C_Y$, by one picture element relative to the sum signals $Y_E+M$ and $Y_E+G$, which are obtained by the addition of a magenta or green picture element signal M or G to a subsequently input yellow picture element signal $Y_E$. The relatively delayed scan signals $C_Y+G$ and $C_Y+M$ and the sum signals $Y_E+M$ and $Y_E+G$ are applied from color separation circuit 45 to a subtracter 46 and to an adder 47.

The cyan, yellow and magenta picture element signals $C_Y$, $Y_E$, and M, the red and blue picture element signals R and B, and the green picture element signal G are related to each other in accordance with the following equations.

$$C_Y = B + G \tag{1}$$

$$Y_E = R + G \tag{2}$$

$$M = R + B \tag{3}$$

Therefore, when the sum signals $C_Y+G$ and $Y_E+M$ are input to the subtracter 46, a composite signal $C_R$ represented by the following equation is obtained as the output from the subtracter 46:

$$\begin{aligned} C_R &= (Y_E + M) - (C_Y + G) \\ &= ((R + G) + (R + B)) - ((B + G) + (G)) \\ C_R &= 2R - G \end{aligned} \quad (4)$$

In a subsequent horizontal scanning, a composite signal $-C_B$ represented by the following equation is obtained from the subtracter 46 in response to the input of sum signals $Y_E+G$ and $C_Y+M$ thereto:

$$\begin{aligned} -C_B &= (Y_E + G) - (C_Y + M) \\ &= ((R + G) + (G)) - ((B + G) + (R + B)) \\ -C_B &= -2B + G \end{aligned} \quad (5)$$

In this way, the composite signals $C_R$ and $-C_B$ are provided alternately for successive horizontal scans.

On the other hand, the luminance signal Y represented by the following equation is obtained from the adder 47 whether the sum signals $C_Y+G$ and $Y_E+M$ are input or the sum signals $Y_E+G$ and $C_Y+M$ are input in successive horizontal scans:

$$\begin{aligned} Y &= (Y_E + M) + (C_Y + G) \\ &= (Y_E - G) + (C_Y + M) \\ &= (R + G) + (G) + (B + G) + (R + B) \\ Y &= 3G + 2R + 2B \end{aligned} \quad (6)$$

A multiplexer 50 (FIG. 2B) directly receives the composite signals $C_R$ and $-C_B$ from the subtracter 46, and further composite signals $C_R$ and $-C_B$ through a delay circuit 51 having a delay time of one horizontal synchronization period. The multiplexer 50 provides parallel outputs $C_R$ and $C_B$ to a matrix circuit 52 by separating the serially received delayed and non-delayed composite signals $C_R$ and $-C_B$, that is, by switching between the delayed and non-delayed composite signals at each horizontal scanning period.

An adder 53 directly receives the luminance signal Y from the adder 47 and receives the luminance signal Y through a delay circuit 54 having a delay time of one horizontal synchronization period. The adder 53 provides an output to the matrix circuit 52 in which the added luminance signal has its signal level lowered by $\frac{1}{2}$.

The matrix circuit 52 subtracts the composite signals $C_R$ and $C_B$ from the luminance signal Y to provide the green color signal G of the following equation:

$$Y - C_R - C_B = (3G + 2R + 2B) - (2R - G) - (2B - G)$$

$$Y - C_R - C_B = 5G \quad (7)$$

Further, the red and blue color signals R and B are obtained from the green color signal G by carrying out the addition processing of the following equations:

$$C_R + G = (2R - G) + G$$

$$C_R + G = 2R \quad (8)$$

$$C_B + G = (2B - G) + G$$

$$C_B + G = 2B \quad (9)$$

A white balance adjustment circuit 55 made up of variable gain amplifying circuits corrects the signal levels of the red and blue signals R and B with respect to the green color signal G so as to adjust the white balance in response to a control signal $S_{C3}$ provided by a control circuit 56 which is desirably composed of a microcomputer.

The control circuit 56 provides the control signal $S_{C3}$ on the basis of the camera signal $S_S$ from the variable gain amplifier 44. The control circuit 56, in addition to providing the signal $S_{C3}$ for controlling the white balance adjustment, provides a signal $S_{C5}$ which controls the stop 2, a signal $S_{C4}$ which controls the focus of the lens 3, a signal $S_{C1}$ which, through the drive circuit 41, controls an electric charge storage time of the solid-state pick-up element 4, and a signal $S_{C2}$ which controls the gain of the variable gain amplifier 44.

More specifically, an analog-to-digital converter 60, composed of an analog-to-digital converting circuit having a high operation speed so as to be adapted to the quantization of a video signal, converts the camera signal $S_S$ from the variable gain amplifier 44 into a digital signal in synchronism with the timing of raster scanning. The digital output of converter 60 is supplied to a color separation circuit 61, an integrator 62 and a band-pass filter 63.

The color separation circuit 61 performs signal processing of each of the sum signals $C_Y+G$, $Y_E+M$, $Y_E+G$ and $C_Y+M$, as in the color separation circuit 45, the subtracter 46 and the adder 47, and outputs resultantly obtained composite signals $C_R$ and $C_B$ and a luminance signal Y which are supplied to an integrator 65. The integrator 65 performs an integration of each of the composite signals $C_R$ and $C_B$ and the luminance signal Y and outputs its integration results to the control circuit 56.

As a result, in the control circuit 56, a color temperature of a camera picture can be detected form the output signal of the variable gain amplifier 44 on the basis of the integration results from the integrator 65.

In this respect, if the symbol $I_N$ is affixed to each result of the integration of the composite signals $C_R$ and $C_B$ and the luminance signal Y, the control circuit 56 may be considered to provide integration values $I_N(R)$, $I_N(G)$ and $I_N(B)$ with respect to each of the color signals R, G and B by performing the calculations of the following equations:

$$I_N(Y) - I_N(C_B) = I_N(3G + 2R + 2B) - I_N(2R - G) - I_N(2B - G)$$

$$I_N(Y) - I_N(C_R) - I_N(C_B) = I_N(5G) \quad (10)$$

$$I_N(C_R) - I_N(G) = I_N(2R - G) - I_N(G)$$

$$I_N(C_R) - I_N(G) = I_N(2R) \quad (11)$$

$$I_N(C_B) - I_N(G) = I_N(2B - G) - I_N(G)$$

$$I_N(C_B) - I_N(G) = I_N(2B) \quad (12)$$

The control signal $S_{C3}$ is output to the circuit 55 so that the integrated values $I_N(R)$, $I_N(G)$ and $I_N(B)$ assume predetermined proportions to each other for adjusting the white balance.

A gamma correction circuit 67 receives the resulting color signals R, G and B from the white balance adjustment circuit 55 and performs gamma correction for chroma signals, whereupon, the gamma corrected color signals are converted into color difference signals R-Y and B-Y in a matrix circuit 68.

An encoder 69 receives the color difference signals R-Y and B-Y and a luminance signal supplied from the delay circuit 54 through a gamma correction circuit 70 for a luminance signal. The encoder 69 combines the received color difference and luminance signals to produce a video signal $S_V$.

Since the white balance is adjusted on the basis of a digital signal produced by analog-to-digital conversion of the output signal of the variable gain amplifier 44, the stop 2 and other functions of the camera can be controlled simultaneously on the basis of such digital signal when necessary. As a result, the whole construction of the camera can be correspondingly simplified.

When the white balance is adjusted on the basis of the digital signal, as aforesaid, there is no need to provide separate integrators 22, 23 and 24 (FIG. 1) for the several color signals R, G and B, respectively as in the prior art white balance control circuit. Therefore, in the camera according to this invention, a camera image can be detected with high accuracy as dispersion of the separate integrators for the several colors is avoided, thereby permitting accurate adjustment of the white balance.

Further, an integrator 72 is connected to the bandpass filter 63 so as to receive a high frequency signal component of the digitized output of variable gain amplifier 44. The integrator 72 provides a respective integration result to the control circuit 56 which detects therefrom a focused state of the camera picture or image.

The control circuit 56 controls the focus of the lens 3 by outputting a control signal $S_{C4}$ which varies the focus of the lens 3 in the direction to maximize the integration result from integrator 72. As a result, a focused camera picture can be obtained.

By converting the output signal of the variable gain amplifier 44 into a digital signal and then controlling the focus of the lens 3 as well as adjusting the white balance circuit 55 on the basis of such digital signal, the white balance adjustment and the focus control can be performed in one control system. Consequently, a video camera 40 with a relatively simplified structure can be achieved.

Figure 5:
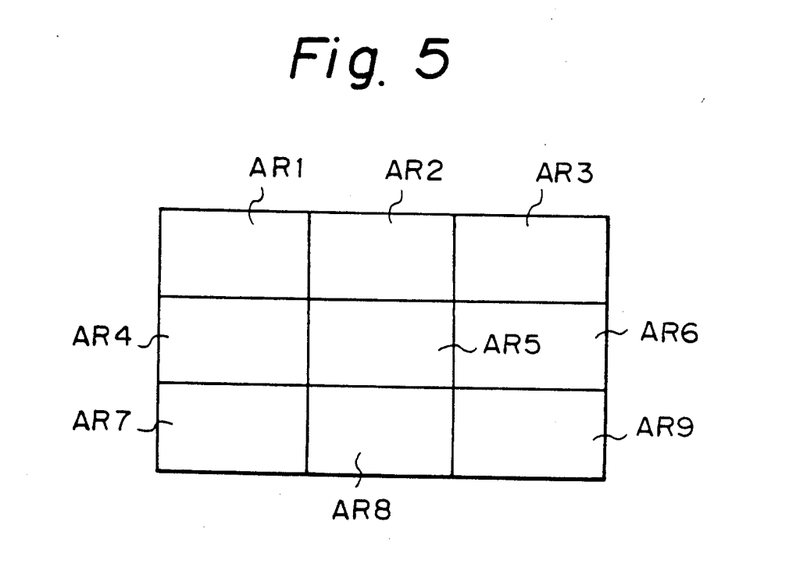
FIG. 5 is a schematic diagram to which reference will be made in explaining the weighting of various portions of the image projected on the pick-up element.

As is shown on FIG. 5, the integrator 62, which receives the digitized output signal from the analog-to-digital converter 60, divides the digitized signal into nine portions corresponding respectively to nine areas AR1~AR9 of the image or camera picture projected on the pick-up element 4. Thus, the signal level of the camera signal $S_S$ can be detected through the integrator 62 for each of the camera picture areas AR1~AR9. The integration result from integrator 62 is supplied to the control circuit 56 which, in response thereto, provides control signals $S_{C1}$, $S_{C2}$ and $S_{C5}$ by which the electric charge storage time of the solid-state pick-up element 4, the gain of the variable gain amplifier 44 and the aperture of the stop 2 are respectively adjusted, as hereinafter further described.

By controlling the stop 2, the electric charge storage time of the solid-state pick-up element 4 and the gain of the variable gain amplifier 44 on the basis of the integration result from integrator 62, the stop 2, the electric charge storage time of the solid-state pick-up element 4 and the gain of the variable gain amplifier 44 can also be controlled by the control system used for control of the white balance adjustment and the lens focus.

The control circuit 56 is selectively changeable between an automatic adjustment mode, a stop preference mode and a shutter speed preference mode by selective actuation of mode selecting elements 75A, 75B and 75C, respectively, provided on an operation panel of the video camera 40. The control circuit 56 variously controls the stop 2, the electric charge storage time of the solid-state pick-up element 4 and the gain of the variable gain amplifier 44 on the basis of the integration result of the integrator 62 in the several modes, as hereinafter described in detail.

More specifically, the control circuit 56 assigns weighting values of 2 and 1 to the integration results for the central camera picture area AR5 and for the peripheral camera picture areas AR1~AR4 and AR6~AR9, respectively, and then adds the weighted integration results and calculates the average thereof.

In the automatic adjustment mode, the stop 2 is controlled by the signal $S_{C5}$ from the control circuit 56 so as to make the average of the weighted integration results a predetermined value while the electric charge storage time of the solid-state pick-up element 4 is maintained at 1/60 second by the control signal $S_{C1}$ applied from control circuit 56 to driving circuit 41.

The stop 2 has a Hall element (not shown), and the aperture ratio of the stop 2 is detected by the control circuit 56 by supplying the output signal of the Hall element to the control circuit 56 through an analog-to-digital converter 77.

If the level of the camera signal $S_S$ is not maintained at least at a predetermined value even by fully opening the stop 2, the level of the camera signal $S_S$ is increased to such predetermined value by the control signal $S_{C2}$ from the control circuit 56 which suitably increases the gain of the variable gain amplifier 44. Similarly, if the level of the camera signal $S_S$ is not lowered to be equal to, or less than a predetermined value by full narrowing of the stop 2, the gain of the variable gain amplifier 44 is suitably decreased by the control signal $S_{C2}$ so that the level of the camera signal $S_S$ is decreased to such predetermined value.

In this way, by weighting the central camera picture area AR5 with a relatively large value, as compared with the peripheral camera picture areas AR1~AR4 and AR6~AR9, when calculating an average value, the maintenance of the level of the camera signal provided from the central camera picture area AR5 within a predetermined range can be given priority while the level of the camera signal derived from the entire camera picture is held within a predetermined range.

Actually, with the video camera 40, a camera subject can be picked up clearly whether the background is bright or dark by giving priority to holding the level of the camera signal provided from the central camera area AR5 within the predetermined range. The foregoing results from the fact that the subject is usually picked up so as to appear at the central position of the camera picture.

In the present case, the control circuit 56 is operated to obtain the average value only with respect to those areas of the camera areas AR1~AR9 in which the respective integration value is equal to or smaller than a predetermined value when the circuit 56 effects the weighting operation in deriving the average value. With this in mind, it will be seen that, even when the amount of incident light is remarkably increased at a part of the camera picture areas, for example, when the desired subject is back lighted, the camera picture areas other than the brightly lighted picture area will not appear unnaturally dark. By reason of the foregoing arrangement according to this invention, the operation element for correcting or compensating for back-lighting, as provided in conventional cameras, can be omitted to further simplify the structure.

When the stop preference mode is selected, the control circuit 56 controls the stop 2 so as to keep the aperture ratio at a desired value set by a user and suitably varies the control signal $S_{C1}$ so as to change the charge storage time of the pick-up element 4 for maintaining the average value of the amount of incident light at a predetermined value.

Further, if the signal level of the camera signal $S_S$ does not rise to a predetermined level even when electric charge storage is increased to the maximum, that is, 1/60 second, the gain of the variable gain amplifier 44 is increased so that the signal level of the camera signal $S_S$ is increased thereby to the predetermined value.

Conversely, if the level of the camera signal $S_S$ is not lowered to be equal to, or less than the predetermined value even when the electric charge storage time is reduced to the minimum, the gain of the variable gain amplifier 44 is decreased so as to decrease the level of the camera signal $S_S$ to the predetermined value.

Therefore, the level of the camera signal $S_S$ output from the variable gain amplifier 44 can be maintained at a predetermined value while the aperture ratio is kept at a constant value.

As a result, a camera picture of substantial depth, as desired by a user, can be provided and the freedom of use of the video camera 40 is improved.

In the shutter speed preference mode, the control circuit 56 controls the electric charge storage time so that the shutter speed set by a user is maintained, and the control circuit 56 further determines the control signal $S_{C5}$ to control the stop 2 for ensuring that the average value of the amount of incident light becomes a predetermined value.

Further, when the level of the camera signal $S_S$ does not rise to the predetermined value upon full opening of the stop 2, the gain of the variable gain amplifier 44 is increased so that the level of the camera signal $S_S$ is thereby raised to the predetermined value. In contrast to the foregoing, when the level of the camera signal $S_S$ is not decreased to be equal to, or less than the predetermined value in response to full narrowing of the stop 2, the gain of the variable gain amplifier 44 is decreased so that the level of the camera signal $S_S$ is thereby decreased to the predetermined level.

In this way, a camera picture taken at a shutter speed desired by the user can be provided.

As a result, when necessary or desired, either the stop preference mode or the shutter speed preference mode can be selected instead of the automatic adjustment mode, so that the freedom of use of the video camera 40 is enhanced.

It will be seen that, in the described embodiment of this invention, the solid-state pick-up element 4, the driving circuit 41 and the sample and hold circuit 43 constitute means for producing a camera signal. The color separation circuit 45, the subtracter 46, the adders 47 and 53, the delay circuits 51 and 54, the multiplexer 50, the matrix circuit 52, the white balance adjustment circuit 55, the gamma correction circuits 67 and 70, and the encoder 69 form a signal processing circuit for converting the camera signal $S_S$ into the video signal $S_V$. Further, the control circuit 56, the color separation circuit 61 and the integrator 65 form means for controlling the adjustment of the white balance of the signal processing circuit.

In the above-described embodiment, the camera signal obtained from the sample and hold circuit 43 is converted into a digital signal at the analog-to-digital converter 60 after passing through the variable gain amplifier 44 and is then integrated at the integrator 62 for each of the camera picture areas AR1~AR9, with the integration results being output to the control circuit 56. With this arrangement, the level of the camera signal $S_S$ provided from the variable gain amplifier 44 is detected for each of the camera areas AR1~AR9. Moreover, the output signal of the analog-to-digital converter 60 is output to the control circuit 56 through the band-pass filter 63 and the integrator 72 to detect a focused state of the camera picture.

Further, the output signal of the analog-to-digital converter 60 is supplied to the control circuit 56 through the color separation circuit 61 and the integrator 65 to permit the control circuit 56 to detect a color temperature of the camera picture.

By reason of the described arrangement, a control signal $S_{C4}$ is output from the control circuit 56 on the basis of the integration result of the integrator 62 to control the focus of the lens 3. On the basis of the integration result of the integrator 65, a control signal $S_{C3}$ is supplied from the control circuit 56 to the white balance adjustment circuit 55 to adjust the white balance of the video signal $S_V$. Meanwhile, the stop 2 and the gain of the variable gain amplifier 44 are controlled on the basis of the integration result of the integrator 52 in the automatic adjustment mode so that the camera signal assumes the predetermined level.

On the other hand, in the stop preference mode, the shutter speed and the gain of the variable gain amplifier 44 are controlled so as to keep the level of the camera signal $S_S$ at the predetermined value, while the stop 2 is held constant to provide the aperture ratio set by a user.

Further, in the shutter speed preference mode, the stop 2 and the gain of the variable gain amplifier 44 are controlled to keep the camera signal $S_S$ at the predetermined signal level while the shutter speed is held constant to provide the shutter speed set by a user.

In the camera according to an embodiment of the invention, by converting the output signal of the variable gain amplifier 44 into a digital signal and controlling the white balance adjustment on the basis of such digital signal, the adjustment of the focus of the lens 3, and other functions of the camera can be effected simultaneously when necessary. As a result, a camera with a correspondingly simplified construction can be provided.

Although complementary color filters in a checkerboard arrangement are employed in the described embodiment, the color filters need not be limited to that configuration, and may be striped or of primary colors rather than of Cyan, yellow, green and magenta, as in FIG. 3.

Furthermore, in the above-described embodiment, the color separation circuit 61 performs the signal processing of each of the sum signals $C_Y+G$, $Y_E+M$, $Y_E+G$ and $C_Y+M$, which are output sequentially, as in the color separation circuit 45, the subtracter 46 and the adder 47, and the resultant composite signals $C_R$ and $C_B$ and the luminance signal Y are integrated in the integrator 65. However, the present invention is not limited to such arrangement, and various color temperature detecting methods can be applied to the case where each of the sum signals $C_Y+G$, $Y_E+M$, $Y_E+G$ and $C_Y+M$ is integrated, for example, and resultant integration results are separated for each color signal.

Furthermore, in the above-described embodiment, the camera picture has been stated to be equally divided into nine camera picture areas. However, the present invention is not limited to that arrangement and may be readily applied to a case where the central camera picture area is larger than the other divided areas, or, for example, to a case where the number of areas into which the camera picture is divided is other than nine.

Further, although in the above-described embodiment, the integration results provided from the central and peripheral camera picture areas are weighted by 2 and 1, respectively, the weighting coefficients are not limited to those values and may be otherwise selected when necessary or desirable.

Additionally, although, in the above-described embodiment, the integration results provided in respect to the divided camera picture areas are weighted in obtaining an average value, and the stop 2, the shutter speed and the gain of the variable gain amplifier 44 are controlled on the basis of such average value, the present invention is not thus limited. In other words, the present invention can be readily applied to cases where the average of the signal level is detected with respect to the whole camera picture, and the stop 2, the shutter speed and the gain of the variable gain amplifier 44 are controlled on the basis of the detection result, or to the case where the signal level is detected with respect to only a part of the camera picture and the control is performed on the basis of such detection result.

Moreover, in the above-described embodiment, the usual operation element for correcting or compensating for back lighting has been omitted, but such operation element may nevertheless be provided if desired.

Further, in the above-described embodiment, the white balance adjustment, and the like are controlled on the basis of the output signal from the variable gain amplifier 44. However, the present invention is not limited to that arrangement and, for example, such control may be carried out based on the input signal to the variable gain amplifier 44.

Moreover, in the above-described embodiment, the present invention has been applied to a color television camera for outputting a video signal. However, the present invention is not limited to such application and may be similarly applied to a video camera which outputs a color signal or where a luminance signal and a color difference signal are output.

It will be apparent that, generally in accordance with the present invention, the stop, the shutter speed, the gain of the variable gain amplifier, and the like, can be controlled simultaneously when necessary while the white balance is adjusted on the basis of the output or the input of the variable gain amplifier, thereby making possible overall simplification of the camera.

Also, according to the present invention, the stop and the gain of the variable gain amplifier can be controlled in one system which operates on the basis of the output or input of the variable gain amplifier, so as to permit further simplification of the camera as compared with the prior art.

Further, according to the present invention, the stop, the shutter speed and the gain of the variable gain amplifier can be controlled in one system by controlling all of these functions on the basis of the output or input of the variable gain amplifier. Consequently, by switching when necessary, between the automatic adjustment mode, the stop preference mode, the shutter speed preference mode, and the like, a video camera having enhanced freedom of use is obtained.

Although a specific embodiment of the invention has been described with reference to the drawings, it is to be understood that the invention is not limited to that precise embodiment, and that the above noted, and other changes and modifications, can be effected therein by one skilled in the art without departing from the scope or spirit of the invention as defined in the appended claims.

What is claimed is:

1. A video camera comprising:
   pick-up means for outputting a picked-up signal corresponding to a camera picture;
   lens means for directing incident light in the form of the camera picture onto a light reception surface of said pick-up means and having a controllable focus;
   adjustable stop means for limiting the amount of said incident light;
   variable gain amplifier means for varying a level of said picked-up signal;
   signal processing means for converting an output of said variable gain amplifier means into a video signal and including means for adjusting a white balance of said video signal; and
   control means for controlling said focus of the lens means, said adjustable stop means, said gain of said variable gain amplifier and said means for adjusting a white balance of said video signal on the basis of said output of said variable gain amplifier.

2. A video camera as in claim 1; further comprising:
   analog-to-digital converter means for converting said output of said variable gain amplifier into a digital signal output.

3. A video camera as in claim 2; further comprising:
   means for detecting the white balance of said video signal from said digital signal output of said analog-to digital converter means;
   means for detecting said gain from said digital signal output of said analog-to-digital converter means; and
   means for detecting said focus from said digital signal output of said analog-to-digital converter means.

4. A video camera as in claim 3; in which said means for detecting the white balance includes color separation means receiving said digital signal output and separating the latter into composite and luminance signals, and integrating means for integrating said composite and luminance signals and providing integration results from which a color temperature of said image is determined by said control means.

5. A video camera as in claim 3; in which said means for detecting the gain of said variable gain amplifier means includes integrating means receiving said digital signal output and performing integrations for portions of said digital signal output corresponding to respective areas of said camera picture, whereupon, an average of the integration results is output to said control means as an indication of said gain.

6. A video camera as in claim 5; in which said areas of the camera picture include central and peripheral areas, and said integrating means weights said central area more heavily than said peripheral areas when forming said average of the integration results.

7. A video camera as in claim 3; in which said means for detecting the focus of said lens means includes band-pass filter means receiving said digital signal output and passing a high frequency signal component thereof, and integrating means for integrating said high frequency signal component and supplying the corresponding integration result to said control means as an indication of said focus.

8. A video camera as in claim 3; in which said means for detecting the white balance includes color separation means receiving said digital signal output and separating composite and luminance signals therefrom, and first integrating means for integrating said composite and luminance signals and providing corresponding integration results from which said control means determines a color temperature of said image; said means for detecting the gain of said variable gain amplifier means includes second integrating means receiving said digital signal output for integrating portions of said digital signal output corresponding to respective areas of said camera picture, and for averaging the respective integration results as an indication to said control means of said gain; and said means for detecting the focus of said lens means includes band-pass filter means receiving said digital signal output and passing a high frequency signal component, and third integrating means for integrating said high frequency signal component and supplying the corresponding integration result to said control means as an indication of said focus.

9. A video camera as in claim 8; in which said areas of the camera picture include central and peripheral areas, and said second integrating means weights said central area more heavily than said peripheral areas when forming said average of the respective integration results.

10. A video camera comprising:
pick-up means for outputting a signal corresponding to a camera picture;
lens means for directing incident light in the form of the camera picture onto a light reception surface of said pick-up means and having a controllable focus;
adjustable stop means for limiting the amount of said incident light;
variable gain amplifier means for varying a gain of said signal output from the pick-up means;
analog-to-digital converter means for converting an output from said variable gain amplifier means into a digital signal output;
means for detecting said gain from the digital signal output of said analog-to-digital converter means including integrating means for receiving said digital signal output and performing integrations for portions of said digital signal output corresponding to respective areas of said camera picture, whereupon, an average of the integration results is output as an indication of said gain;
means for detecting said focus from the digital signal output of said analog-to-digital converter means; and
control means for controlling said focus of the lens means, said adjustable stop means and said gain of said variable gain amplifier means on the basis of said integration results output from said means for detecting said gain.

11. A video camera as in claim 10; in which said areas of the camera picture include central and peripheral areas, and said integrating means weights said central area more heavily than said peripheral areas when forming said average of the integration results.

12. A video camera as in claim 10; in which said means for detecting said focus includes band-pass filter means receiving said digital signal output and passing a high frequency signal component thereof, and additional integrating means for integrating said high frequency signal component and supplying the corresponding integration result to said control means as an indication of said focus.

13. A video camera comprising:
pick-up means for outputting a picked-up signal corresponding to a camera picture;
lens means for directing incident light in the form of the camera picture onto a light reception surface of said pick-up means and having controllable focus;
variable gain amplifier means for varying a level of said picked-up signal;
signal processing means for converting an output of said variable gain amplifier means into a video signal and including means for adjusting a white balance of said video signal; and
control means for controlling said focus of the lens means, said gain of said variable gain amplifier and said means for adjusting a white balance of said video signal on the basis of said output of said variable gain amplifier.

14. A video camera as in claim 13; further comprising:
analog-to-digital converter means for converting said output of said variable gain amplifier into a digital signal output.

15. A video camera as in claim 14; further comprising:
means for detecting the white balance of said video signal from said digital signal output of said analog-to-digital converter means;
means for detecting said gain from said digital signal output of said analog-to-digital converter means; and
means for detecting said focus from said digital signal output of said analog-to-digital converter means.

16. A video camera as in claim 15; in which said means for detecting the white balance includes color separation means receiving said digital signal output and separating the latter into composite and luminance signals, and integrating means for integrating said composite and luminance signals and providing integration results from which a color temperature of said image is determined by said control means.

17. A video camera as in claim 15; in which said means for detecting the gain of said variable gain amplifier means includes integrating means receiving said digital signal output and performing integrations for portions of said digital signal output corresponding to respective areas of said camera picture, whereupon, an average of the integration results is output to said control means as an indication of said gain.

18. A video camera as in claim 17; in which said areas of the camera picture include central and peripheral areas, and said integrating means weights said central area more heavily than said peripheral areas when forming said average of the integration results.

19. A video camera as in claim 15; in which said means for detecting the focus of said lens means includes band-pass filter means receiving said digital signal output and passing a high frequency signal component thereof, and integrating means for integrating said high frequency signal component and supplying the corresponding integration result to said control means as an indication of said focus.

20. A video camera comprising:
pick-up means for outputting a picked-up signal corresponding to a camera picture;
lens means for directing incident light in the form of the camera picture onto a light reception surface of said pick-up means;
adjustable stop means for limiting the amount of said incident light;
variable gain amplifier means for varying a level of said picked-up signal;
signal processing means for converting an output of said variable gain amplifier means into a video signal and including means for adjusting a white balance of said video signal; and
control means for controlling said adjustable stop means, said gain of said variable gain amplifier and said means for adjusting a white balance of said video signal on the basis of said output of said variable gain amplifier.

21. A video camera as in claim 20; further comprising: analog-to-digital converter means for converting said output of said variable gain amplifier into a digital signal output.

22. A video camera as in claim 21; further comprising:
means for detecting the white balance of said video signal from said digital signal output of said analog-to-digital converter means; and
means for detecting said gain from said digital signal output of said analog-to-digital converter means.

23. A video camera as in claim 22; in which said means for detecting the white balance includes color separation means receiving said digital signal output and separating the latter into composite and luminance signals, and integrating means for integrating said composite and luminance signals and providing integration results from which a color temperature of said image is determined by said control means.

24. A video camera as in claim 22; in which said means for detecting the gain of said variable gain amplifier means includes integrating means receiving said digital signal output and performing integrations for portions of said digital signal output corresponding to respective areas of said camera picture, whereupon, an average of the integration results is output to said control means as an indication of said gain.

25. A video camera as in claim 22; in which said areas of the camera picture include central and peripheral areas, and said integrating means weights said central area more heavily than said peripheral areas when forming said average of the integration results.

* * * * *